*US009988748B2*

United States Patent
Prouvost et al.

(10) Patent No.: US 9,988,748 B2
(45) Date of Patent: Jun. 5, 2018

(54) DEVICE FOR LOCKING AND UNLOCKING AN ELONGATE TUBULAR ELEMENT

(75) Inventors: Stéphane Prouvost, Hem (FR); Tanguy Le Gall, Croix (FR); Valery Dalle, Croix (FR); Julien Barnet, Concarneau (FR)

(73) Assignee: Cousin Trestec, Wervicq Sud (FR)

( * ) Notice: Subject to any disclaimer, the term of this patent is extended or adjusted under 35 U.S.C. 154(b) by 1067 days.

(21) Appl. No.: 14/234,416

(22) PCT Filed: Jul. 25, 2012

(86) PCT No.: PCT/FR2012/051765
§ 371 (c)(1),
(2), (4) Date: Apr. 24, 2014

(87) PCT Pub. No.: WO2012/172272
PCT Pub. Date: Dec. 20, 2012

(65) Prior Publication Data
US 2014/0223967 A1 Aug. 14, 2014

(30) Foreign Application Priority Data
Jul. 29, 2011 (FR) ..................................... 11 56973

(51) Int. Cl.
*D04C 1/06* (2006.01)
*D04B 1/06* (2006.01)
(Continued)

(52) U.S. Cl.
CPC ................ *D04C 1/06* (2013.01); *B63B 21/08* (2013.01); *B63H 9/10* (2013.01); *D04B 1/06* (2013.01); *F16G 11/02* (2013.01)

(58) Field of Classification Search
CPC .......... F16G 11/02; F16G 11/00; F16G 11/14; F16G 11/10; A62B 1/14; B63B 21/08; Y10T 24/39; Y10T 24/3998
See application file for complete search history.

(56) References Cited

U.S. PATENT DOCUMENTS

| 675,788 A | * | 6/1901 | Oakley | ..................... A62B 1/14 188/65.1 |
| 1,195,069 A | * | 8/1916 | Myers | ..................... A62B 1/14 188/65.5 |

(Continued)

FOREIGN PATENT DOCUMENTS

| DE | 4442840 A1 | 6/1996 |
| JP | 60014632 A | 1/1985 |

(Continued)

OTHER PUBLICATIONS

Written Opinion of the International Searching Authority for corresponding International Application No. PCT/FR2012/051765 with English translation dated Feb. 4, 2014 (9 pages).

*Primary Examiner* — Victor D Batson
*Assistant Examiner* — Matthew J Sullivan
(74) *Attorney, Agent, or Firm* — Bookoff McAndrews, PLLC

(57) ABSTRACT

The present invention provides a device (1) for locking and unlocking an elongate tubular element (2), the device comprising: a. A braided or knitted tubular locking sleeve (3) that has a first end (3*a*) and a second end (3*b*), and that has an inlet orifice (4) for allowing said elongate tubular element (2) into it, and an outlet orifice (5) for allowing said elongate tubular element (2) out of it; b. Fastener means (6) for fastening said locking sleeve (3) to a support (7); and c. Tensioner means (8) for tensioning said locking sleeve (3) along a substantially rectilinear path (L) making it possible to lock said elongate tubular element (2) inside said locking sleeve (3) between said inlet orifice (4) and said outlet orifice (5), said tensioner means (8) being deactivatable manually, and/or by using deactivation means (9), for unlocking said elongate tubular element (2) to enable it to slide inside the (Continued)

internal volume of the locking sleeve (3) and through said inlet orifice (4) and said outlet orifice (5).

19 Claims, 2 Drawing Sheets

(51) Int. Cl.
*B63B 21/08* (2006.01)
*B63H 9/10* (2006.01)
*F16G 11/02* (2006.01)

(56) References Cited

U.S. PATENT DOCUMENTS

| | | | | | |
|---|---|---|---|---|---|
| 1,264,179 | A | * | 4/1918 | Harley | A62B 1/14 188/65.5 |
| 2,181,392 | A | * | 11/1939 | Chatham | F16G 11/03 24/115 N |
| 2,688,172 | A | * | 9/1954 | Kellems | F16G 11/03 24/115 N |
| 2,936,625 | A | * | 5/1960 | Heiseler | F16B 7/20 192/223.4 |
| 3,040,402 | A | * | 6/1962 | Rible | D07B 1/18 24/115 N |
| 3,216,682 | A | * | 11/1965 | Lewis | F16L 3/14 24/115 N |
| 3,343,231 | A | * | 9/1967 | Clay | F16B 7/14 24/115 N |
| 3,374,013 | A | * | 3/1968 | Clay | F16L 3/00 24/115 N |
| 3,883,102 | A | * | 5/1975 | Trigg | G08G 1/02 24/115 K |
| 4,055,875 | A | * | 11/1977 | Strickland | F16G 11/02 24/115 N |
| 4,781,138 | A | * | 11/1988 | Hay | B63B 21/00 114/221 R |
| 4,912,816 | A | * | 4/1990 | Brandt | B63B 21/00 114/230.26 |
| 5,099,546 | A | * | 3/1992 | Mackal | F16G 11/02 16/110.1 |
| 5,655,269 | A | * | 8/1997 | Sagalovich | F16B 2/06 188/65.1 |
| 6,460,226 | B1 | * | 10/2002 | Smith | F16G 11/00 24/115 R |
| 9,150,368 | B2 | * | 10/2015 | Hodges | B65G 69/2835 |

FOREIGN PATENT DOCUMENTS

WO 9102179 A1 2/1991
WO WO 9102179 A1 * 2/1991 ............. F16G 11/02

* cited by examiner

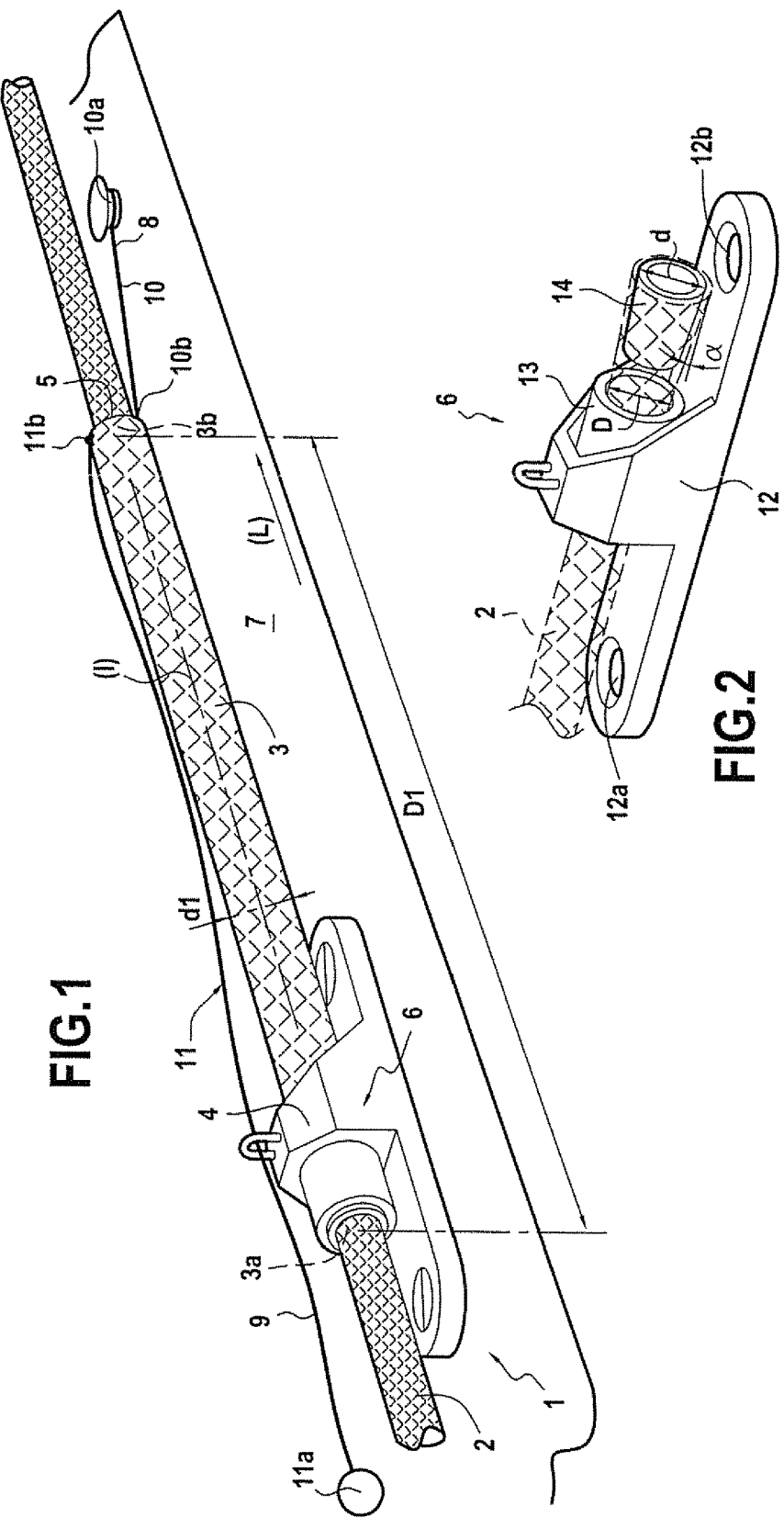

DEVICE FOR LOCKING AND UNLOCKING AN ELONGATE TUBULAR ELEMENT

TECHNICAL FIELD

The present disclosure relates to the technical field of devices for locking and unlocking an elongate tubular element, in particular in the boating field.

BACKGROUND OF THE DISCLOSURE

The locking and unlocking devices to which the disclosure applies are commonly referred to as locks, grippers, or jammers in the ship's chandler field.

For hoisting and setting the sail(s) of a sailboat, it is necessary to use various ropes (in particular halyards and sheets) that, depending on the operation, slacken (ease), or tension (trim) said sail(s) to which they are connected. Beyond a certain wind speed and also depending on the surface area of the sails, the force to be exerted on the ropes requires mechanical assistance to be used, in particular via devices for locking and unlocking said ropes. Depending on the size of the sailboat and on the weather conditions, tensions of several hundreds of kilograms (kg) and even up to two metric tonnes are exerted on the ropes.

Devices for locking and unlocking elongate tubular elements, such as ropes, are usually mechanical devices, each of which has a rigid or semi-rigid main part that is machined or molded. Such a main part preferably has a cylindrical through hollow inner portion passing the rope to be locked and unlocked. Such a device also has mechanical means that are manually actuatable for locking and unlocking the rope in said hollow portion, it being possible for such means to be a lever, a spring system or indeed crenellated or serrated portions that, in any event, flatten the rope over a portion of its length in order to lock it. Said flattened portion thus goes from being substantially circular in cross-section to being oval and flattened in cross-section.

Such devices suffer from numerous drawbacks. Since the rope is locked by being flattened, it sometimes tends to slip inside said inner portion, thereby changing the setting of the sails. In addition, since the rope is flattened, and subjected to difficult wear conditions (salt water, sun, etc.), the mechanical flattening accelerates mechanical and chemical degradation of the rope.

Such mechanical devices are not suitable for ropes that are merely braids, because such ropes slip and cannot be locked reliably. It is thus necessary to provide a braided over-sleeve or a covering in order to improve the behavior of the rope and thus in order to enable it to be locked reliably.

Even when over-sleeves or coverings are provided over the ropes, certain high-performance materials, such as, for example, ultra high molecular weight polyethylene (marketed, for example, under the Dyneema® trademark), when they are disposed on the outside of the rope, make it impossible for such ropes to be locked effectively because the ropes then slip in such mechanical devices because of the very low coefficient of friction of said materials.

Such mechanical devices are individually limited to very specific outside diameters for the ropes because it is necessary to match the outside diameter of the rope to be locked and the inside diameter of the hollow inner portion in a manner that is suitable for obtaining effective locking.

When such mechanical devices are unlocked, the tension is often released suddenly so that it is then necessary to re-tension the ropes. To mitigate that drawback, prior to the unlocking, a free portion of the rope is mounted on a winch, thereby making it possible, while the rope is being unlocked, to re-tension the rope as it is being released.

Document WO 91/02179 discloses a locking device comprising a housing from which an actuating arm projects that is coupled to a locking sleeve that, in its internal volume, receives an elongate element to be locked. By means of the actuating arm, the user causes the compression exerted by the locking sleeve on said element to vary by moving two portions of the locking sleeve towards each other or apart from each other. That device is designed, in particular, to be fastened to the deck of a boat. That housing is voluminous, complex to manufacture, and affords little possibility for improving the slippage resistance that is imparted by the locking sleeve. Increasing the tenacity and the weight of the yarns used in the clamping sleeve is limited by the available internal volume. In addition, that locking sleeve is manufactured from wires that, in operation, act abrasively on the surface of the elongate element, in particular in the boating field, in which half the ropes sold are made of multi-filament yarns of polyethylene terephthalate (PET).

The device disclosed in Document U.S. Pat. No. 4,055,875 suffers from the same drawbacks as mentioned above because of the presence of a housing having a limited internal volume. In addition, the means for locking the elongate element are not formed by a braided locking sleeve, as in the device of the preceding document, but rather they are made up of one or more strands coiled around the elongate element to be locked. It can be understood that the slippage resistance that is imparted is low, in particular since that locking device is adapted for the climbing field, i.e. for withstanding a maximum of a few hundred kilograms.

There therefore exists a need, in particular in the boating field, for a locking and unlocking device that is compact, easy to adjust and to implement, inexpensive, and that makes it possible to achieve high locking strength (also referred to as slippage resistance in the remainder of the present text).

SUMMARY OF THE DISCLOSURE

The present disclosure mitigates some or all of the above-mentioned problems in that it provides a device for locking and unlocking an elongate tubular element, which device is adapted for the boating field and comprises:

a. A braided or knitted tubular locking sleeve that has an internal volume and a first end and a second end, and that has an inlet orifice for allowing said elongate tubular element into its internal volume, and an outlet orifice for allowing said elongate tubular element out of its internal volume;

b. Fastener means for fastening said locking sleeve to a support; and c. Tensioner means for tensioning said locking sleeve along a substantially rectilinear path (L) making it possible to lock said elongate tubular element in the internal volume of said locking sleeve between said inlet orifice and said outlet orifice, said tensioner means being deactivatable manually, and/or by using deactivation means, for unlocking said elongate tubular element to enable it to slide inside the internal volume of the locking sleeve and through said inlet orifice and said outlet orifice.

Advantageously, the distance between the inlet and outlet orifices of said locking sleeve is greater than or equal to fifteen times the outside diameter of said elongate element to be locked.

The term "elongate tubular element" should be understood to mean any element having a length greater than its width, and in particular any elongate tubular element comprising a braided or knitted rope, and optionally further comprising a braided or knitted covering made of a polymer material, e.g. a covering extruded over said rope. Preferably, the outside surface of the elongate element is in relief, and in particular the outside surface of said elongate element includes single-filament and/or multi-filament yarns that are interlaced, and in particular braided or knitted. Preferably, the elongate tubular element is sufficiently flexible for it to be possible for it to be knotted.

Advantageously, the knitted or braided structure of the locking sleeve imparts a certain amount of elasticity to it by means of the interlaced yarns moving relative to one another in the longitudinal direction (l) of said locking sleeve. When the locking sleeve is tensioned along a substantially rectilinear path (L), the knitted or braided yarns extending into the internal volume create an inside surface in relief that is suitable for coming into friction with the outside surface of the elongate tubular element, thereby preventing it from sliding inside the internal volume of said locking sleeve between the inlet orifice and the outlet orifice thereof.

In addition, the distance between the inlet orifice and the outlet orifice is large compared with Chinese finger trap locking systems, but it makes it possible to lock elongate elements to which forces of more than 500 decanewtons (daN), 1000 daN, or indeed 4500 daN (e.g. for an elongate element having a diameter of 14 millimeters (mm)) are applied, without using a voluminous external housing that takes up a large amount of space, in particular on the deck of a boat. Furthermore, the distance between the inlet orifice and the outlet orifice is readily adjustable using a locking sleeve, compared with a cam housing or a housing including a short portion of locking sleeve inside its internal volume.

Surprisingly, embodiments of the locking sleeve of the present disclosure makes it possible to achieve large slippage resistances with an outside diameter of only about 10 mm, and thus makes it possible to procure a locking device that is compact, reliable, and durable.

A non-exhaustive explanation is that this feature makes it possible to obtain a friction interface between the locking sleeve and the elongate element that is sufficient, in particular for the elongate elements used in the boating field. However, the influence of this parameter, in particular on the slippage resistance procured by the locking sleeve, compared with the influence of the tenacity of the yarns, of the number of yarns, or indeed of the weight of the yarns is, surprisingly, very considerable.

In operation, when it is desired to deactivate the tensioner means, it suffices to exert opposite tension on the locking sleeve at the periphery of the outlet orifice, in particular downstream from the outlet orifice, i.e. tension in a direction opposite from the tension causing said locking sleeve to follow a rectilinear path, which opposite tension is also referred to below as "counter tension".

If the elongate tubular element is already tensioned, unlocking the tensioner means causes it to slide freely through the locking sleeve until said elongate tubular element is no longer tensioned or until the operator prevents said elongate tubular element from sliding by reactivating said tensioner means. It is thus very easy to re-actuate said tensioner means by causing said locking sleeve to follow a rectilinear path (L) and by causing the counter-tension exerted on said locking sleeve by the deactivation means to cease. In addition, the locking sleeve acts as guide and brake means while the elongate tubular element is sliding, thereby facilitating adjustment of its length, and preventing said element from sliding suddenly, as observed in state-of-the-art devices.

If the elongate tubular element is not already tensioned, it then remains to exert traction on the elongate tubular element in order to adjust its length and thus in order to adjust the setting of the sail(s) to which said element is connected. Unlocking said elongate element thus does not cause it to slide without the operator exerting traction on said elongate element. Advantageously, in this situation too, the locking sleeve acts as guide means and brake means enabling the tubular element to slide in controlled manner in the internal volume of the locking sleeve.

Upstream from the outlet orifice is defined as being a portion of the locking sleeve that is disposed between the inlet orifice and the outlet orifice, and, downstream from the outlet orifice is defined by opposition to upstream from the outlet orifice, in particular when the outlet orifice and the second end are different, downstream from the outlet orifice then being defined as being a portion of the locking sleeve that is disposed between the outlet orifice and its second end.

Advantageously, since the textile structure of the locking sleeve imparts a certain amount of flexibility to it, the locking sleeve may be used for elongate elements of different outside diameters, or at least for elongate elements of outside diameter equal to the inside diameter of the locking sleeve, or as much as 20% less than the inside diameter of said locking sleeve.

Advantageously, the elongate element is not flattened when it is locked in the locking sleeve so that the mechanical strength and the chemical resistance of the elongate element are improved.

Regardless of the nature of the material(s) disposed on, the outside surface of the elongate element, the friction between the inside surface of the locking sleeve, and the outside surface of said elongate element, and the friction at the inlet and outlet orifices with said elongate element, is sufficient to lock said elongate element.

Finally, the locking and unlocking device of the disclosure is lighter in weight than the state-of-the-art mechanical devices.

The locking sleeve of the disclosure is braided or knitted from synthetic single-filament and/or multi-filament yarns so as to form an inside surface, facing into its internal volume, that is in relief and suitable for exerting friction on the outside surface of the elongate element while said element is sliding inside the internal volume of the locking sleeve. In order for the knitted or braided yarns involved in manufacturing the locking sleeve to be free and to be movable relative to one another, it is thus preferable for the locking sleeve not to have any inner or outer coating secured to its inside or outside surface, such as, for example, a polymer coating in the form of a film.

In the boating field, the locking sleeve has an outside diameter greater than or equal to 3 mm, and preferably greater than or equal to 6 mm.

By way of example, the locking sleeve has any one of the following outside diameters: 6 mm, 8 mm, 10 mm, 12 mm or 14 mm.

The support to which the locking sleeve can be fastened via said fastener means may, for example, be the deck of a sailboat or any other support. For example, in the fields of sport or of safety, in particular in the field of climbing, the support may be a sit harness (fastened around the waist and thighs) or a chest harness (fastened around the waist and over the shoulders).

The device of the disclosure is preferably used in the boating field, but it may also be used in the fields of safety, or of climbing, or in various industrial applications requiring quick and easy locking and unlocking of a flexible elongate tubular element.

According to some embodiments, the distance between the inlet and outlet orifices of the locking sleeve is greater than or equal to twenty times, and preferably greater than or equal to thirty times, and more preferably greater than or equal to forty times, the outside diameter of said elongate element to be locked.

According to some embodiments, the locking sleeve has a first end and a second end that are open, the first open end preferably corresponding to said inlet orifice, and the second open end optionally corresponding to said outlet orifice.

When the first and second ends of the locking sleeve are open and correspond to the inlet and outlet orifices, the friction between the elongate element and the inlet and outlet orifices is limited, thereby preserving the life span of the locking sleeve and facilitating sliding of the elongate element inside the locking sleeve, in the unlocked position, because the elongate element follows a direction that coincides with the longitudinal axis (k) of said locking sleeve.

According to some embodiments, the outlet orifice opens out transversely from the locking sleeve.

The friction between the outlet orifice and the elongate element is then higher than if the outlet orifice were to coincide with the second open end of the locking sleeve.

According to some embodiments, the locking sleeve comprises multi-filament yarns, preferably selected from among the following materials used on their own or in combination: polytetrafluoroethylene (PTFE); polybenzobisoxazole (PBO); aramid: meta-aramid and/or para-aramid; and optionally: 6-6 or 4-6 polyamide (PA); ultra-high molecular weight polyethylene (UHMWPE); polypropylene (PP); polyethylene terephthalate (PET); polyether ether ketone (PEEK); polyether ketone ketone (PEKK); preferably selected on their own or in combination from among polybenzobisoxazole (PBO) and aramid: meta-aramid and/or para-aramid.

The Applicant noticed that when tensions of several hundred kilograms, or indeed several metric tonnes, were applied to the elongate element while it was sliding inside the locking sleeve, certain materials, in particular multifilament yarns made of polyethylene terephthalate, tended to melt partially at the inlet and outlet orifices. It is thus preferred, when tensions of at least several hundred kilograms are applied to the elongate element, while it is sliding, to use abrasion-resistant yarns, and in particular yarns withstanding high temperatures, and in particular having melting points greater than or equal to 250° C.

The Applicant also noticed that the locking function was improved considerably when multi-filament yarns were used in manufacturing the locking sleeve and formed its inside surface.

A non-exhaustive explanation could be that the coefficient of friction of the inside surface is thus higher than if said inside surface were formed of single-filament yarns.

According to some embodiments, the tensioner means comprise a spring mounted on the locking sleeve, said spring having stiffness determined so as to impart a substantially rectilinear path (L) to said locking sleeve.

This feature maximizes the compactness of the tensioner means, and avoids the use of an additional cable on the deck of a boat.

According to some embodiments, the tensioner means comprise an elastic tensioning cable suitable for being secured to said support, and secured to the second end of the locking sleeve, the second end of the locking sleeve preferably having a backsplice forming an attachment loop to which said tensioning cable is secured.

The term "backsplice" is used in the present text to mean any loop formed at the end of a cable by splicing. In which case, the first end of the locking sleeve is either open and acts as an inlet orifice, or closed (optionally provided with a backsplice) or else open and independent from the inlet orifice. In the latter case, the first end of the locking sleeve is preferably used as an attachment portion via the fastener means for fastening the locking sleeve to the support, e.g. to the deck of a boat.

The elastic cable thus has a first end suitable for being secured to the support, in particular via attachment means known from the state of the art, e.g. of the nut and bolt type, and a second end, preferably provided with a backsplice, secured to the second end of the locking sleeve, and preferably the second end of the locking sleeve is provided with a backsplice in which the backsplice of the second end of the elastic cable can be attached.

According to some embodiments, the tensioner means comprise a composite reinforcing rod, suitable for being curved, having first and second ends that are secured to respective ones of the first and second ends of the locking sleeve.

The composite reinforcing rod comprises a textile core, e.g. based on multi-filament yarns made of glass, and a composite matrix, e.g. based on epoxy, on vinyl ester, or indeed on polyurethane.

According to some embodiments, the tensioner means comprise at least three single-filament yarns preferably having an outside diameter greater than or equal to 0.2 mm, and disposed in the braided structure of the locking sleeve.

Advantageously, the tensioner means are incorporated directly in the structure of the locking sleeve, thereby improving the compactness of the locking sleeve, and simplifying the use of the device. The single filaments thus stiffen the locking sleeve, imparting a rectilinear path to it and good resilient return to it.

According to some embodiments, the single-filament yarns are disposed in the structure of the locking sleeve so as to be equidistant, mutually parallel, and parallel to the longitudinal direction U) of said sleeve.

According to some embodiments, the single-filament yarns are selected from among the following polymers, used on their own or in combination: polyether ether ketone (PEEK); polyether ketone ketone (PEKK); polyether-ester block copolymer; polyether block amide (PEBA) copolymer; polyethylene terephthalate (PET); 6-6 or 4-6 polyamide (PA); and polyacetals, in particular polyoxymethylene (POM).

These polymer materials are abrasion resistant even under high heating conditions, and they impart stiffness and resilient return to the locking sleeve.

According to some embodiments, the tensioner means exert tension of at least 1.5 kg, and preferably at least 2 kg, on the locking sleeve.

The inventors have determined that the tensioning should not merely suffice to impart a rectilinear path to the locking sleeve but rather that the tension exerted has a very significant impact on the slippage resistance imparted by the locking sleeve.

According to some embodiments, the locking sleeve comprises multi-filament yarns braided in "one up, one down or two down" mode so as to form inside and outside faces in relief.

The term "one up, one down or two down mode" is used to mean that the multi-filament yarns are not overlapping or overlap only one yarn or two yarns at the most using the selected smallest pattern for repetition of the interlacing mode.

This feature is analogous to weaves, corresponding in this example to a plain weave or a ½ twill weave. Conversely, a weave of the ⅓ or more twill type makes provision for an interlacing mode of one up, three or more down, thereby generating large floats of yarns.

In the context of the present disclosure, such floats are not desired because they generate surfaces that are more uniform and thus less in relief.

The one up, one down or two down link mode, also known to the person skilled in the art as "pearl cable", makes it possible to procure inside and outside faces of the locking sleeve that are in relief, thereby improving the slippage resistance or locking strength.

According to some embodiments, the deactivation means comprise a pull cable having a first end and a second end, the second end of said pull cable is secured at the periphery of the outlet orifice to the locking sleeve (e.g. by means of a backsplice formed at said second end of the pull cable and passing through yarns disposed at the periphery of said outlet orifice), preferably downstream from the outlet orifice, so that, by applying traction, in particular manually, to a portion of said pull cable towards said inlet orifice, the outlet orifice and the inlet orifice are moved closer together, enabling the elongate tubular element to be unlocked, and enabling it to slide through said inlet orifice and said outlet orifice when traction is exerted on said elongate tubular element.

The first end of the pull cable is free and can be taken hold of by an operator.

According to some embodiments, the fastener means for fastening the locking sleeve to a support comprise a base to which a cylindrical first hollow part is secured that has an inside diameter (D), and a moving second hollow part that is frustoconical, that has a slope (u) of less than 10°, and preferably of less than 5°, and that has its largest outside diameter (d) less than the inside diameter of said first part. Said first part and said second part are arranged so that the locking sleeve is suitable for passing inside said first part and for sheathing said second part, and so that the second part, as sheathed by said locking sleeve, being engaged in inter-fitting manner into said first part makes it possible to secure the locking sleeve to said base.

Said base is fastened to the support via known fastener means, of the nut and bolt type, or indeed by adhesive bonding, in particular when the support is the deck of a boat.

If the support is a sit harness or a chest harness, said base may be provided with at least one opening, and preferably with two openings disposed on either side of the first part, and through which keepers, in particular made of textile material, may be inserted and sewn onto the support.

According to some embodiments, the inlet orifice opens out transversely from the locking sleeve, the second end of the locking sleeve optionally being open and corresponding to the outlet orifice, and the fastener means comprise a plate, provided with attachment means for attaching the first end of the locking sleeve, and with guide means for guiding said elongate tubular element, in particular a ring mounted on said plate.

According to some embodiments of the disclosure, the device includes an elongate element to be locked, the outside surface of which element includes multi-filament yarns braided in a "one up, one down or two down" mode.

The definition of the one up, one down or two down link mode is described above with reference to the locking sleeve.

This feature improves the slippage resistance of the elongate element in the locking sleeve.

BRIEF DESCRIPTION OF THE FIGURES

The present disclosure can be better understood on reading the following description of three exemplary embodiments of locking and unlocking devices according to the disclosure that are given by way of non-limiting example, and with reference to the following accompanying figures, in which:

FIG. 1 is a diagrammatic perspective view of a first embodiment of a locking and unlocking device of the disclosure;

FIG. 2 is a diagrammatic perspective view of the means for fastening the locking sleeve that are shown in FIG. 1;

DETAILED DESCRIPTION

Figure 3:
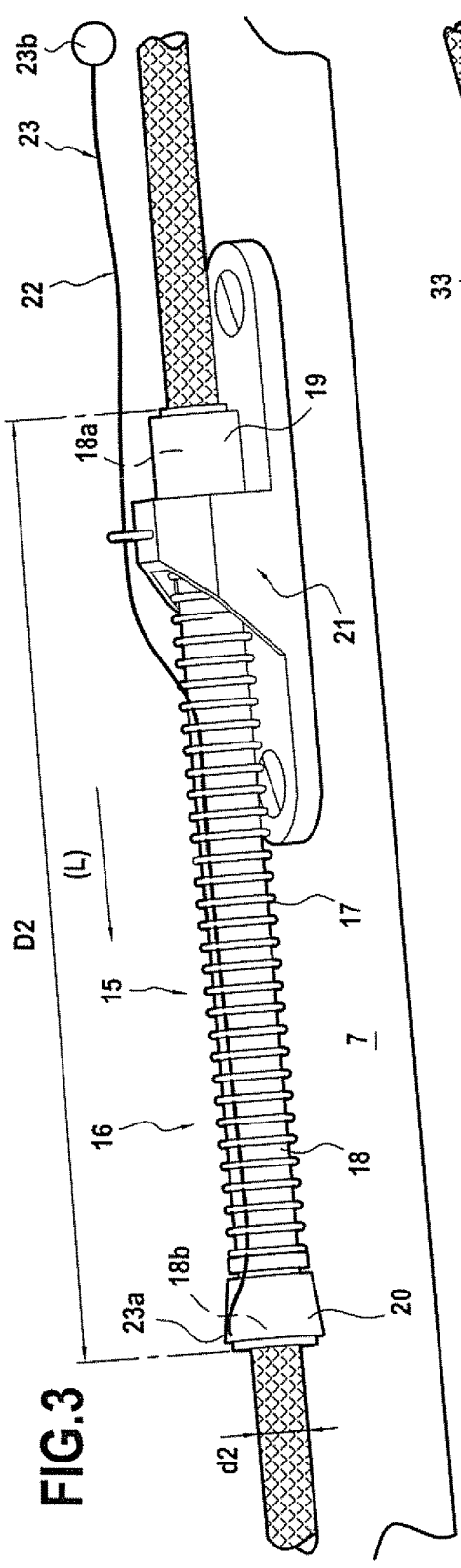
FIG. 3 is a diagrammatic perspective view of a second embodiment of a locking and unlocking device of the disclosure.

The locking and unlocking device 1, shown in FIG. 1, for locking and unlocking an elongate tubular element 2 comprises a tubular locking sleeve 3 that has an internal volume and braided or knitted first and second ends 3a, 3b, and that has an inlet orifice 4 for allowing said elongate tubular element 2 into its internal volume, and an outlet orifice 5 for allowing said elongate tubular element 2 out of its internal volume.

The device 1 is further provided with fastener means 6 for fastening the locking sleeve 3 to the support 7, such as the deck of a sailboat.

The device 1 is also provided with tensioner means 8 for tensioning the locking sleeve 3 along a substantially rectilinear path (L) making it possible to lock said longitudinal tubular element 2 in the internal volume of the locking sleeve 3 between said inlet orifice 4 and said outlet orifice 5. Said tensioner means 8 are deactivatable manually, using deactivation means 9, for unlocking said elongate tubular element 2 and then for enabling it to slide in the internal volume of the locking sleeve 3 and through said inlet orifice 4 and through said outlet orifice 5.

In this first example, the locking sleeve 3 has open first and second ends 3a, 3b corresponding to respective ones of said inlet and outlet orifices 4, 5.

In this precise example, the locking sleeve 3 is obtained by braiding multi-filament yarns, preferably based on meta-aramid and/or para-aramid.

The tensioner means 8 comprise an elastic tensioning cable 10 that is suitable for being secured to the support 7 at a first end 10a, and secured at its second end 10b to the second end 3b of the locking sleeve 3, e.g. by means of a backsplice forming a loop passing through the yarns of the second end 3b of the locking sleeve 3.

The first end 10a may also be secured to the second end 3b merely by a knot.

According to some embodiments (not shown), the second end 3b of the locking sleeve 3 may have a backsplice to which the backsplice of the second end 10b of the cable 10 is secured.

The deactivation means 9 comprise a pull cable 11 having first and second ends 11a and 11b, the second end 11b of the pull cable 11 is secured to the periphery of the outlet orifice 5, in particular downstream from said outlet orifice 5 of the locking sleeve 3.

The fastener means 6 for fastening the locking sleeve 3 to the support 7 are shown in FIG. 2.

The fastener means 6 thus comprise a base 12 to which there are secured a first hollow cylindrical part 13 having an inside diameter (D) and a moving second hollow part 14 that is frustoconical and that has a slope (α) less than 10°, and, in this precise example, equal to 3°. Said second part 14 has its largest outside diameter (d) less than the inside diameter (D) of the first part 13.

Said first and second parts 13, 14 are arranged so that the locking sleeve 3 is suitable for passing inside the first part 13 and for sheathing the second part 14. Thus, the second part 14 as sheathed by the locking sleeve 3 engaging in interfitting manner with the first part 13 makes it possible to secure the locking sleeve 3 to the base 12.

In this precise example, the base 12 is provided with two holes 12a and 12b through which known fastener means, of the screw type, can pass, enabling the base 12 to be fastened to the support.

Advantageously, the first and second parts 13 and 14 act as guide means for guiding the elongate tubular element 2 inside the internal volume of the locking sleeve 3. In operation, FIG. 1 shows the elongate tubular element 2 in the locked position in which it is locked in the locking sleeve 3. In order to unlock the elongate tubular element 2, the operator exerts traction on the end 11a of the pull cable 11 so as to move the outlet orifice 3b closer to the inlet orifice 3a, thereby releasing the tension exerted by the locking sleeve 3 on said elongate tubular element 2.

If the elongate tubular element 2 was in a tensioned state, it then slides freely in the internal volume of the locking sleeve 3 until the operator locks said elongate tubular element 2 again by releasing the traction exerted on the end 11a of the pull cable 11.

If the elongate tubular element 2 was not in a tensioned state, the operator then applies traction to a free portion of the elongate tubular element 2 so as to adjust the length thereof, and, once the length of the elongate tubular element has been adjusted to the desired extent, the operator releases the end 11a of the pull cable 11 so as to cause the countertension exerted to cease, and so as to lock the elongate tubular element 2 again in the locking sleeve 3.

In FIG. 1, the distance (D1) between the inlet orifice 3a and the outlet orifice 3b of the locking sleeve 3 is greater than or equal to 15 times the outside diameter (d1) of the elongate element 2.

Table 1 below gives the results of the tests that were conducted on locking sleeves and on an elongate element to be locked that are described with reference to FIGS. 1 and 2. For each test, the locking sleeves and the elongate element for locking were new. Each value indicated in Table 1 is the result of the mean of three tests. The locking sleeves had the same braided structure but the materials of the multi-filament yarns that were used were different. The locking sleeves were thus braided on a braiding loom having 24 spindles each supporting two multi-filament yarns with weight of about 1500 decitex (dtex), and the pitch was 46 mm. The elongate element to be locked included, at its core, 3 multi-filament yarns having three strands of 1100 dtex each made of polyethylene terephthalate and a braided covering with seven multi-filament yarns made of polyethylene terephthalate of 1100 dtex each, the braiding pitch being 38 mm. The elongate element to be locked was inserted into the internal volume of the locking sleeve between its inlet and outlet orifices, and was tensioned using the elastic cable 10 so as to reach 2 kg of load. Once the locking and unlocking device 1 of the disclosure had been fastened via the fastener means 6 to a stationary support, such as the floor, the end of the elongate element to be locked leading out from the outlet orifice in the locking sleeve was then disposed in the jaws of a traction bench, such as an Instron bench, and then traction was exerted on said end at a speed of about 100 millimeters per minute (mm/min), the force as from which the elongate element started to slip being noted in Table 1 below as being the slippage resistance (in daN). The outside diameters of the locking sleeves and of the elongate element to be locked were about 10 mm.

TABLE 1

| Distance between the inlet orifice and the outlet orifice of the locking sleeve (cm) | Measured slippage resistance (daN) | | | |
| --- | --- | --- | --- | --- |
| | Locking sleeve, made of aramid, and in particular of para-aramid | Locking sleeve, made of PBO | Locking sleeve, made of polyethylene terephthalate | Locking sleeve, made of 6-6 polyamide |
| 5 | 4 | 8 | 2 | 1 |
| 10 | 6 | 11 | 5 | 4 |
| 15 | 38 | 56 | 24 | 36 |
| 20 | 123 | 169 | 114 | 153 |
| 30 | 550 | 900 | 370 | 330 |
| 40 | 1500 | 2400 | 660 | 665 |
| 50 | 2560 | 2550 (breakage of the elongate element to be locked) | 1190 | 1010 |

It can be observed that when the distance between the inlet and the outlet orifices was in range ten times the outside diameter of the elongate element to five times the outside diameter of said elongate element, the slippage resistance of the locking sleeves made of aramid or of PBO was increased 1.5 times only. In equivalent manner, the slippage resistance of the locking sleeves made of polyester and of polyamide increased about twice only, whereas a distance between the inlet and outlet orifices fifteen times greater than the outside diameter of the elongate element multiplied by seven the slippage resistance of the sleeves based on aramid or on PBO, and multiplied the slippage resistance of the locking sleeves made of polyester or of polyamide by eleven or by thirty-six. Surprisingly, instead of working on the tenacity of the yarns and on the number of yarns to braid in order to improve the slippage resistance imparted by the locking sleeve, it is possible to improve said slippage resistance without modifying the structure of the locking sleeve but rather by increasing the distance between the inlet orifice and the outlet orifice.

Thus, a distance between the orifices of 40 cm, i.e., in this example, equal to forty times the outside diameter of the elongate element to lock, made it possible to improve the slippage resistance by about forty times for a sleeve based on aramid or on PBO, and, respectively, by about twenty-seven times and about eighteen times for a sleeve based on PET or on 6-6 PA, compared with a distance between the orifices of 15 cm.

Table 2 below gives the various slippage resistance values obtained under the same conditions as those described for Table 1, for the same locking sleeves and for the same elongate elements to be locked. The only differences are that the locking sleeve had a distance between the inlet and outlet orifices of 40 cm, and that the tension applied by the elastic cable 10 varied.

TABLE 2

| Tension applied by the elastic cable 10 (kg) to the locking sleeve | Measured slippage resistance (daN) | | | |
| --- | --- | --- | --- | --- |
| | Locking sleeve, made of para-aramid | Locking sleeve, made of PBO | Locking sleeve, made of polyethylene terephthalate | Locking sleeve, made of 6-6 polyamide |
| 0.25 | 544 | 1120 | 70 | 50 |
| 0.5 | 697 | 1430 | 100 | 90 |
| 1 | 854 | 1780 | 270 | 235 |
| 1.5 | 1180 | 1932 | 450 | 400 |
| 2 | 1450 | 2056 | 660 | 665 |
| 2.5 | 1519 | 2233 | 885 | 849 |
| 3 | 1598 | 2460 | 950 | 982 |

The results show clearly that the tension applied by the elastic cable to the locking sleeve, that, in this precise example, constituted the tensioner means, had an impact on slippage resistance. Thus, a tension greater than or equal to 1.5 kg made it possible to achieve slippage resistance of at least 1000 daN for a locking sleeve based on aramid or PBO, and of more than 400 daN for a locking sleeve based on PET or on 6-6 PA, said locking sleeves having an outside diameter of only 10 mm. These values are particularly advantageous for replacing cam locks that are known in the boating field as being limited to locking tensions of about 500 daN. Beyond that force, the elongate element to be locked slips in the cam lock and ultimately tears.

Table 3 below shows the results of the behavior on "letting go" observed on the locking sleeves and on the elongate element to be locked that are described above for tables 1 and 2, the structure of the tested sleeves and elongate elements being identical, only the material and the distance between the inlet and outlet orifices of the locking sleeve changing, that distance being 50 times the outside diameter of the elongate element to be locked. The tension exerted by the tensioner means, and in particular by the elastic cable 10 was 2 kg. A tension of 1000 daN was exerted on the free end of the elongate element coming out through the outlet orifice 3b of the locking sleeve by clamping jaws of a traction bench, e.g. of the Instron type, and then the locked elongate element was "let go" by deactivating the tensioner means by exerting counter tension on the pull cable 11, the elongate element then slipping inside the locking sleeve. This operation was repeated 10 times. The "letting go" tension was a tension that is usual in the boating field, in particular for sailboats that are more than 10 meters (m) long, in particular racing sailboats.

TABLE 3

| Behavior of locking sleeve and of elongate element to be locked | Locking sleeve made of para-aramid | Locking sleeve made of PBO | Locking sleeve made of PET | Locking sleeve made of 6-6 PA |
| --- | --- | --- | --- | --- |
| After one "letting go" release | Locking sleeve and elongate element to be locked in good states | Locking sleeve and elongate element to be locked in good states | The elongate element to be locked and the locking sleeve were fused together over a portion of their lengths extending over several centimeters. | Locking sleeve and elongate element to be locked in good states |
| After 10 "letting go" releases | Locking sleeve and elongate element to be locked in good states, but a few fibers appeared on the locking sleeve | Locking sleeve and elongate element to be locked in good states, but a few fibers appeared on the locking sleeve | Test impossible because fusion occurred at the first attempt | The locking sleeve was highly degraded in the presence of spots of fusion between the locking sleeve and the elongate element to be locked. |

It can be observed that the aramid and PBO locking sleeves were intact even after 10 "letting go" releases even though the elongate element to be locked was made of polyethylene terephthalate. This feature is particularly advantageous because, in the boating field, over one half of the elongate elements used are made of polyethylene terephthalate.

In addition, it was observed that the fibrils that developed on the locking sleeves, in particular their internal volumes, further improved their slippage resistance. A non-exhaustive interpretation of this phenomenon would be that such fibrils increase the coefficient of friction between the locking sleeve and the elongate element to be locked.

Conversely, it can also be observed that the locking sleeves made of PET or of PA fused with the elongate element to be locked respectively after one letting go release and after ten letting go releases.

FIG. 3 shows a second embodiment of a locking and unlocking device 15 that differs from the first embodiment of the locking and unlocking device 1 in that the tensioner means 16 comprise a spring 17 mounted on the locking sleeve 18, the spring 17 having stiffness determined so as to impart a substantially rectilinear path (L) to the locking sleeve 18.

In this embodiment, the first and second ends 18a and 18b of the locking sleeve 18 are open and correspond to respective ones of the inlet and outlet orifices 19, 20.

The fastener means 21 for fastening the first end 18a of the locking sleeve 18 are identical to the fastener means 6 described in FIG. 2.

The deactivation means 22 are identical to the deactivation means 9 shown in FIG. 1 in that they comprise a pull cable 23 having its end 23a fastened to the outlet orifice 20 while the end 23b is free to be operated by an operator.

Figure 4:
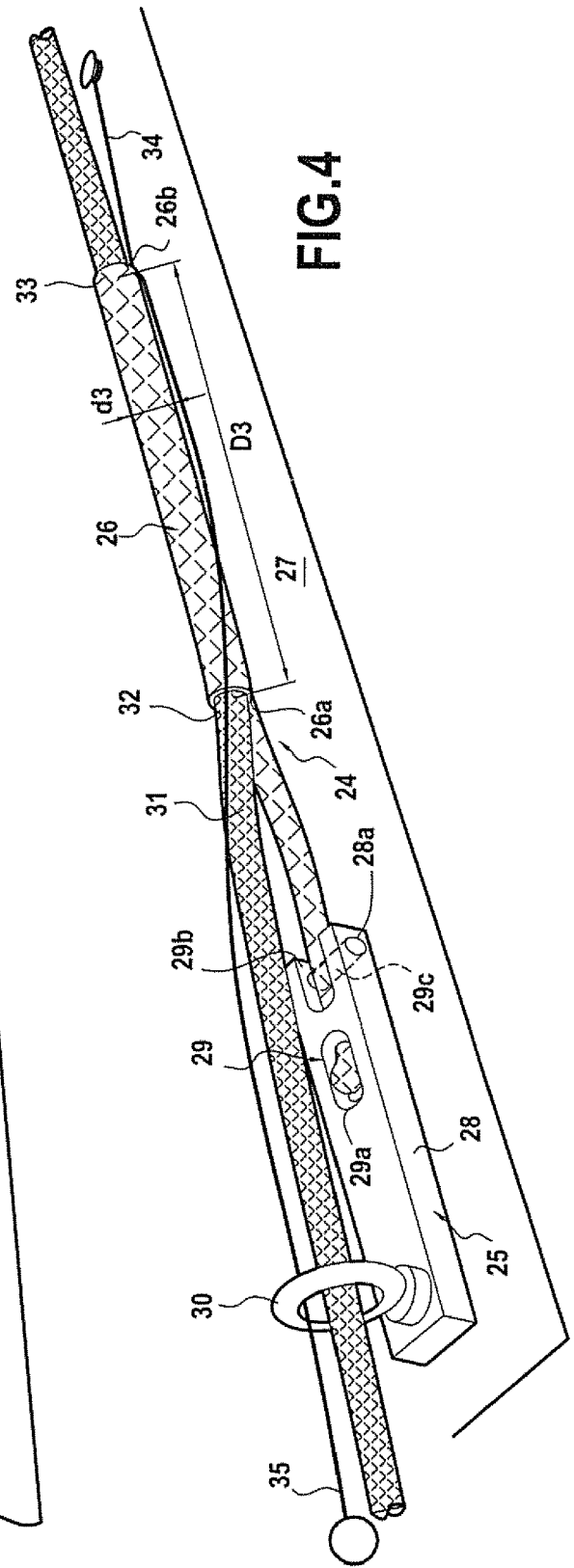
FIG. 4 is a diagrammatic perspective view of a third embodiment of a locking and unlocking device of the disclosure.

The third embodiment of the locking and unlocking device 24 that is shown in FIG. 4 differs from the devices 1 and 15 in that the fastener means 25 for fastening the locking sleeve 26 to a support 27 comprise a plate 28 having attachment means 29 in the form of two recesses 29a and 29b. The recess 29a enables known fastener means, such as screws, to pass through for fastening the plate 25 to the support 27. The recess 29b is provided with two openings 28a in register with each other and enabling a pin 29c to pass through the first end 26a provided with a backsplice. The recess 29b forms an open U-shape having its opening facing towards the front of the plate 29 so as to guide the locking sleeve 26.

The fastener means 25 further comprise a ring 30 mounted on the plate 28 and acting as guide means for guiding the elongate tubular element 31.

In this embodiment, the inlet orifice 32 is different from the first end 26a of the locking sleeve 26. The first end 26a of the locking sleeve 26 may be open or closed, and it is preferably closed by a backsplice. The inlet orifice 32 thus opens out transversely from the locking sleeve 26. The outlet orifice 33 of the elongate tubular element 31 of the locking sleeve 26 corresponds to the open second end 26b of the locking sleeve 26.

In this example, the tensioner means 34 are identical to the tensioner means 8 described in FIG. 1, and the deactivation means 35 are identical to the deactivation means 9 and 22 shown in FIGS. 1 and 3.

In FIGS. 3 and 4, the distances (D2, D3) between the inlet orifices (18a, 26a) and the outlet orifices (18b, 26b) of the locking sleeves (18, 26) are greater than or equal to 15 times the outside diameters (d2, d3) of the elongate elements 2 to be locked.

The invention claimed is:

1. A device for locking and unlocking an elongate tubular element, the device comprising:
   a braided or knitted tubular locking sleeve that has an internal volume and a first end and a second end, and that has an inlet orifice for allowing said elongate tubular element into its internal volume, and an outlet orifice for allowing said elongate tubular element out of its internal volume;
   a fastener for fastening said locking sleeve to a support; and
   a tensioner for tensioning said locking sleeve along a substantially rectilinear path making it possible to lock said elongate tubular element in the internal volume of said locking sleeve between said inlet orifice and said outlet orifice, said tensioner being deactivatable by using a deactivation device for unlocking said elongate tubular element to enable it to slide inside the internal volume of the locking sleeve and through said inlet orifice and said outlet orifice;
   wherein said deactivation device comprises a pull cable having a first end and a second end, the second end of said pull cable is secured at the periphery of the outlet orifice to the locking sleeve, so that, by applying traction, to a portion of said pull cable towards said inlet orifice, the outlet orifice and the inlet orifice are moved closer together, enabling the elongate tubular element to be unlocked, and enabling it to slide through said inlet orifice and said outlet orifice when traction is exerted on said elongate tubular element; and
   wherein the distance between the inlet and outlet orifices of said locking sleeve is greater than or equal to 15 times the outside diameter of said elongate element to be locked.

2. The device according to claim 1, wherein the distance between the inlet and outlet orifices of said locking sleeve is greater than or equal to twenty times, the outside diameter of said elongate element to be locked.

3. The device according to claim 1, wherein the locking sleeve has a first end and a second end that are open, the first open end corresponding to said inlet orifice, and the second open end corresponding to said outlet orifice.

4. The device according to claim 1, wherein the inlet orifice or the outlet orifice opens out transversely from the locking sleeve.

5. The device according to claim 1, wherein the locking sleeve comprises multi-filament yarns and/or single-filament yarns.

6. The device according to claim 1, wherein the tensioner comprises a spring mounted on the locking sleeve, said spring having stiffness determined so as to impart a substantially rectilinear path to said locking sleeve.

7. The device according to claim 1, wherein the tensioner comprises an elastic tensioning cable suitable for being secured to said support, and secured to the second end of the locking sleeve.

8. The device according to claim 1, wherein the tensioner comprises a composite reinforcing rod, suitable for being curved, having first and second ends that are secured to respective ones of the first and second ends of the locking sleeve.

9. The device according to claim 1, wherein the tensioner comprises at least three single-filament yarns disposed in the braided structure of the locking sleeve.

10. The device according to claim 9, wherein the single-filament yarns are disposed in the structure of the locking sleeve so as to be equidistant, mutually parallel, and parallel to the longitudinal direction of said sleeve.

11. The device according to claim 9, wherein the single-filament yarns are selected from among the following polymers, alone or in combination: polyether ether ketone (PEEK); polyether ketone ketone (PEKK); polyacetals, polyoxymethylene (POM); polyether-ester block copolymer; and polyether block amide (PEBA) copolymer.

12. The device according to claim 1, wherein the tensioner exerts a tension of at least 1.5 kg.

13. The device according to claim 1, wherein the locking sleeve comprises multi-filament yarns braided in "one up, one down or two down" mode so as to form inside and outside faces in relief.

14. The device according to claim 1, wherein the fastener for fastening the locking sleeve to a support comprises a base to which a cylindrical first hollow part is secured that has an inside diameter, and a moving second hollow part that is frustoconical, that has a slope of less than 10°, and that has its largest outside diameter less than the inside diameter of said first part, said first part and said second part being arranged so that the locking sleeve is suitable for passing inside said first part and for sheathing said second part, and so that the second part, as sheathed by said locking sleeve, being engaged in interfitting manner into said first part makes it possible to secure the locking sleeve to said base.

15. The device according to claim 1, wherein the inlet orifice opens out transversely from the locking sleeve, and the fastener comprises a plate, provided with an attachment for attaching the first end of the locking sleeve, and with a guide for guiding said elongate tubular element.

16. The device according to claim 1, wherein the device includes an elongate element to be locked, the outside surface of which element includes multi-filament yarns braided in a "one up, one down or two down" mode.

17. The device according to claim 5 wherein the multi-filament yarns and/or single filament yarns are selected among the following materials alone or in combination: polytetrafluoroethylene (PTFE); polybenzobisoxazole (PBO); aramid: meta-aramid and/or para-aramid; 6-6 or 4-6 polyamide (PA); ultra-high molecular weight polyethylene (UHMWPE); polypropylene (PP); polyethylene terephthalate (PET); polyether ether ketone (PEEK); polyether ketone ketone (PEKK); polyacetals; polyoxymethylene (POM); polybenzobisoxazole (PBO) and aramid: meta-aramid and/or para-aramid.

18. The device according to claim 7, wherein the second end of the locking sleeve has a backsplice forming an attachment loop to which said tensioning cable is secured.

19. The device according to claim 9, wherein said single filament yarns have an outside diameter greater than or equal to 1 mm.

\* \* \* \* \*